United States Patent Office 3,083,170
Patented Mar. 26, 1963

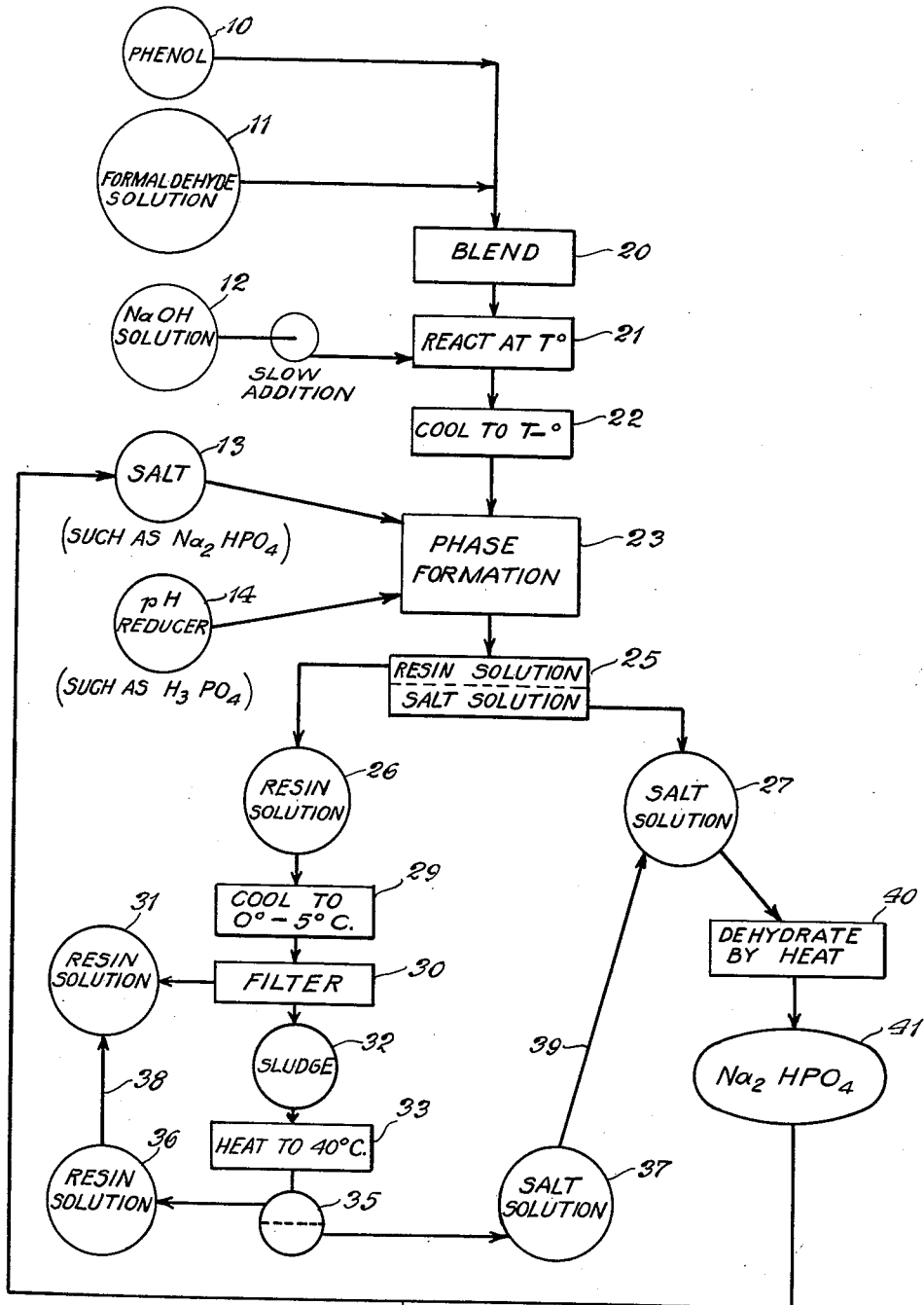

3,083,170
METHOD OF SEPARATING AQUEOUS SOLUTION OF PHENOL-FORMALDEHYDE RESIN FROM POLYMERIZATION SYSTEM
Raymond G. Booty, Granville, Ohio, assignor, by mesne assignments, to Pacific Resins & Chemicals, Inc., Seattle, Wash., a corporation of Washington
Filed Apr. 8, 1955, Ser. No. 500,057
23 Claims. (Cl. 260—29.3)

The present invention relates generally to the production of phenol-formaldehyde resins, and in particular to a water-solution of water-soluble thermosetting condensation products of phenol and formaldehyde produced in the presence of an alkaline catalyst.

The present invention is a continuation-in-part of my prior application Serial No. 367,496, filed July 13, 1953, and now abandoned.

The condensation of phenol and formaldehyde in an aqueous medium in the presence of dissolved alkali as a catalyst is a well-known reaction forming a water-soluble product of variable degrees of condensation. It employs a wide range in proportion of formaldehyde to phenol. To secure concentrated fluid aqueous resin compositions it is common practice to dewater the condensation reaction mass by vacuum evaporation.

The present invention aims to dewater the condensation by means avoiding subjection of the condensation product to prolonged action of heat as is common in dewatering by vacuum evaporation. One result of such heating is uncontrolled advancement of the resin so that from batch to batch the character of the resulting resin varies.

In prior practice, where such uncontrolled advancement takes place, it becomes useless to conduct the original condensation reaction under conditions such that the initial product thereof is more or less standardized from batch to batch.

Therefore, because the present invention avoids the said uncontrolled advancement by heat to dewater, and retains the degree of advancement achieved in terminating the conditions of the initial condensation reaction, it permits and makes desirable and important the imposition of conditions for conducting the initial condensation reaction so that its product is uniform from batch to batch.

Accordingly, the present invention involves not only improvements in dewatering any homogeneous aqueous condensation of phenol and formaldehyde, but also optionally and preferably the conditions of conducting the condensation reaction to provide an improved mass to be dewatered.

These prior art practices entail numerous disadvantages. In the condensation, time and temperature are factors affecting the degree of condensation and polymerization. For uniformity of product from batch to batch, it is necessary to maintain uniform conditions as to time and temperature, assuming other factors to be constant. In attempting to do this, numerous difficulties are experienced. One of these is the variable extension of the chemical reaction during the period of distilling away the water under vacuum. Other difficulties arise from other factors, such for example as the exothermic character of the reaction in the presence of caustic soda. These conditions frequently negative the results in attempts to control time and temperature.

The condensation reaction does not go to completion in the initial preparation stage, with the result that there remain in the reaction mass uncombined formaldehyde and uncombined phenol at the time when the removal of water is conventionally initiated by vacuum distillation. As a result, part of the initial reacting material is lost by volatilization. This loss is irregular, making uncertain and variable the proportion of phenol to formaldehyde in the finished product and, therefore, non-uniformity from batch to batch.

The present invention aims to overcome these conditions and to provide a process susceptible to precise control from batch to batch, and also easy to carry out in commercial equipment.

It is the general object to improve the process for making water-soluble condensation products of phenol and formaldehyde.

It is a particular object of the invention to avoid heating the condensation product in the steps of dewatering the initial aqueous condensation mass.

It is one object of the invention to control the time and temperature of all the processing so that initial ingredients are preserved without appreciable loss and reacted always to the same predetermined extent, whereby uniform results from batch to batch are achieved.

It is a particular object of the invention to control the time and temperature of the reaction mass by slowly adding the alkaline catalyst.

It is also a particular object of the invention to retard the condensation reaction prior to dewatering by lowering the pH from that imparted by the alkaline catalyst to a pH which does not promote further reaction.

It is a general object of the invention to effect an initial dewatering of the initial reaction mass at lower-than- reaction temperature by salting-out a liquid resin-containing phase; and particularly by selection of the salt so that any of its content which is distributed into the resin phase may be at least in part readily removed therefrom.

It is a further object of the invention to effect the dewatering at temperatures lower than the reaction temperature and by the use of an addition agent which results in the formation of a two-phase liquid mass, one phase of which is an aqueous solution of low aquosity having a content of resin solids increased over that of the reaction mass.

Various other and ancillary objects and advantages of the invention will become apparent from the following description and explanation of the invention set forth in reference to the accompanying drawing in which:

The FIGURE is a flow sheet representing the preferred processing involved.

The improvements herein described are founded upon phase formation and separation by salting-out. Although the processing described herein involves many other factors and controls not necessary to such salting-out, it is to be understood that these become important only because of the salting-out procedure, and, therefore, in combination therewith constitute new processes for the production of resin.

As is well known in the art, the proportion of phenol to formaldehyde may be varied over a wide range for the same manufacturing procedure. For the process of the present invention there may be used for each mole of phenol from .75 to 3.0 moles of formaldehyde, and preferably from 1.5 to 2.75 moles of formaldehyde per mole of phenol.

The concentration of said reactants in the water employed may be varied over an appreciable range, the content of water being held desirably low in order to minimize the processing for dewatering. One way to minimize use of water is to employ the formaldehyde in aqueous solution of increased strength over the conventional strength. Commonly, formaldehyde is provided in solutions of about 37% strength, but stronger solutions are available and it is preferred for the present invention to use a formaldehyde solution of 50% strength by weight.

The conventional initial condensation reaction is effected by reacting all the ingredients in the presence of all the catalyst. Heat is generated and the time and the extent of heat generation influence the condensation. Large batches are difficult to control in temperature when heat is generated faster than a cooling system is effective. Thus, in commercial practice, it is difficult to maintain constant temperature conditions.

Accordingly, one of the improved steps in the present invention is the maintenance of a constant temperature during the condensation. An effective way to do this when the quantity of catalyst is such as to lead to rapid exothermic reaction, is gradually to add the alkaline catalyst at a given rate over a given period of time, or in other words under conditions reproducible from batch to batch. The conditions are chosen with respect to the particular equipment being used so that heat is not generated faster than it may be removed by cooling equipment. As a result, the character of the condensation product is reproducible from batch to batch, of course assuming that raw materials, time, and temperature follow a fixed schedule. One particular way in which this may be done is to fix a total reaction time at a constant temperature and introduce the alkaline catalyst at a fixed rate over a shorter period, whereby the additional time may be employed for bringing the reaction to any predetermined end point.

A second improved step which may be used with or without the above described first step improvement is the dewatering of the aqueous reaction mass under conditions retarding extension of the reaction and avoiding volatilizing organic matter. This may be done by adding an agent which results in the formation of two liquid phases, one being an aqueous phase holding the major portion of the water, and the other being a resin phase holding substantially all of the resin and a decreased and minor portion of the water. Essentially the process is one of salting-out, and the main ingredient of the agent is a salt used in amount to form a heavy aqueous salt layer and a lighter upper resin layer. The salt so functioning may be added as such or in part be formed from an agent reactive with catalyst in the mass to form desired salt, or it may be in part an agent for imparting and maintaining a desirable pH for the mass.

Extension of the condensation reaction is readily avoided by cooling the reaction mass at the chosen end point to a fixed temperature and then rendering the catalyst ineffective. The step may be related to and even combined with the phase formation. The phase formation is effected by forming in the presence of the organic condensation-reaction product an aqueous solution of salt, such as one or more of the phosphate salts of sodium, for example a mixture of disodium phosphate and monosodium phosphate, and of sufficient salt concentration to cause the latter to dewater a resulting floating resinous layer of lowered pH in equilibrium therewith. This requires adding material reactive with caustic soda to reduce the pH thereby converting caustic soda to salt substance, and if necessary adding more salt substance.

The material reactive with caustic soda may be selected from the group consisting of orthophosphoric acid, monosodium phosphate, disodium phosphate, and aqueous solutions thereof. The amount so added for such function of course depends upon the amount of caustic soda present and the pH to which it is desired to lower the mass for controlling the pH either for the phase separation or for the ultimate resin solution. The amount so selected for such function may be insufficient to provide the necessary amount of salt substance, and in that event salt substance may also be selected to secure the desired phase separation.

When certain anhydrous salts are selected, the quantity required may be considerably reduced, the water from the ingredients of the resin-forming condensation being abstracted by the anhydrous material to form the liquid phase salt solution, preferably of one or more sodium phosphates. For example, anhydrous disodium phosphate takes on water forming various crystalline disodium phosphates of the formula $Na_2HPO_4 \cdot xH_2O$, wherein $x$ may be 2, 7 or 12. The transition temperatures are 95° C. when $x=2$, 48.3° C. when $x=7$ and 34.6° C. when $x=12$. The dihydrate may be formed in the range from 95° to 48.3° C.; the heptahydrate in the range from 48.3° to 34.6° C.; and the dodecahydrate below 34.6° C. Monosodium phosphate has a pH of about 4 and it crystallizes with two moles of water at room temperature. Accordingly, conditions for forming various crystal mixtures may vary in a range depending upon pH and the mixture of the sodium phosphates. Therefore, in the present invention where the aqueous phase has a solute which consists substantially all, but not necessarily entirely, of disodium phosphate, the two-phase mass to be separated as liquids is formed and separated at a temperature suitably above about 30° C. according to the amount of water in the aqueous phase in proportion to the disodium phosphate.

In the drawing, the preferred process is schematically indicated by reference in certain instances to specific but illustrative detail to give significance.

Numeral 10 designates a supply of high grade phenol, preferably U.S.P. monohydroxybenzol. Numeral 11 represents a supply of formaldehyde solution, preferably 50% by weight (and detailed later in Example 1). Numeral 12 represents a prepared supply of catalyst preferably in the form of a 50% by weight solution of caustic soda in water. Numeral 13 represents a supply of salt substance if such is required. Numeral 14 represents a supply of material for reaction with caustic soda and it may contain all the salt substance needed.

The phenol 10 and formaldehyde 11 are first blended to solution at 20 including heating the blend to a chosen reaction temperature T° in the range from 50° to 95° C., but preferably in the range from 70° to 95° C. Then during a fixed time $t_1$ the caustic soda solution 12 is added as shown at 21 at a regular rate such that the reacting mass may be maintained at T°. After the period $t_1$ the reaction is continued for a time to $t_2$. The time $t_1$ is not less than one-third of $t_1+t_2$, and the time $t_1+t_2$ will widely vary, depending upon temperature when a water-soluble resin is desired. The time $t_2$ may vary upwardly from zero when the formaldehyde has reached an equilibrium concentration prior to adding all the caustic soda. The added time $t_2$ controls the degree of polymerization of the initial condensation product.

Then the mass is cooled at 22 to a lower temperature to check the reaction, the temperature 60° C. being merely illustrative of any suitable temperature over about 30° C. for the subsequent operations. Into the cooled mass is introduced any needed quantity of selected agent or mixture of agents to provide suitable conditions for a mass of two liquid phases at a temperature above 34.6° C. The selected material includes one or more agents to bring the pH of the salt solution to any selected one in the range from 4 to 9. Phosphoric acid, disodium phosphate and monosodium phosphate function to lower the pH. Phosphoric acid, for example, neutralizes the caustic soda 12, generating heat, and when the mass at 23 is at 30° C. the heat generated will raise its temperature up to 34.5 to 40° C. Numeral 23 represents the resulting two-phase mass at a pH for the aqueous phase in the range from 4 to 9. The lower layer is a solution predominantly of phosphate salt of sodium and water. The top layer is a dewatered resin solution, and it may have a slightly higher pH. The resin-carrying layer in its liquid form is separated from the material of the lower layer while the latter is a liquid or is a layer containing hydrated crystals. Such separation is indicated at 25, giving products 26 and 27 for further treatment.

Some salt and water are present by distribution in the resin layer, which may be cooled to effect further phase concentration of the resin content. When the resin layer has a pH below 5.5, it is difficult to effect crystal formation by cooling, and in such case the pH is raised, as by adding strong caustic soda solution. Resin product 26 at a pH of at least 5.5 is cooled at 29, the last cooling from 15° to 25° C. to 0° to 5° C. being slow to form hydrated crystals of residual phosphate salt of sodium. These are filtered out at 30 giving the final resin solution 31 and a filter sludge. The sludge 32 may be heated at 33° to 40° C. or higher to melt the crystals, again forming a mass of two liquid layers, which are separated at 35 into resin 36 and salt solution 37. Line 38 shows the resin 36 added to resin 31, and line 39 shows the salt solution 37 added to salt solution 27. Salt solution 27 may be dehydrated at 40, to provide a new supply 41 of $Na_2HPO_4$, which may be used as supply 13 as shown by line 42.

An alternative to melting the sludge 32, especially where it is within a filter press, is to run the next hot batch of resin after the reaction 21, through the press, thereby to hasten the cooling of it, thereby to dissolve the crystals in the sludge for addition to the salt layer to be formed in the batch so used through the press and thus lowering the pH value unless it has already been reduced by adding acidic material before the new batch enters the press, and thereby to pick up the resin left in the sludge by the preceding batch. This alternative procedure is illustrated in the drawings by dotted lines. The reaction mass 21 is passed by line 21a through step 22a in what may be a filter press containing the sludge 32 from a previous batch. The dotted line 32a indicates that the sludge 32 of a preceding batch is that which is taken up by a succeeding batch. The material leaving the filter press is then moved back to the main processing of the flow sheet for the phase separation 23. The return is indicated by dotted line 22b, to assure that the cooling is sufficient for the phase separation 23.

The following examples are illustrative:

EXAMPLE 1

U.S.P. phenol in the amount of 3140 pounds is mixed with 5500 pounds of aqueous formaldehyde solution containing 50% by weight of formaldehyde HCHO, less than 2% of methyl alcohol and the remainder water. To the mixture at 75° C. is slowly added 450 pounds of a 50% by weight solution of NaOH in water, at a regular rate within 60 minutes, while maintaining the mass at 75° C. After an additional 40 minutes the mass is cooled to 60° C. Then 250 pounds of anhydrous $Na_2HPO_4$ is added and, when it is dissolved, the cooling is continued to 30° C. Then 350 pounds of a 75% solution in water of $H_3PO_4$ is added, which brings the pH to 7.6 and raises the temperature to one in the range from 34° to 40° C. On standing, two liquid layers form with aqueous phosphate solution in the lower layer and a dewatered resin solution above. The lower layer is withdrawn and the upper resin layer cooled quickly to 15° to 25° C., then slowly to 0° to 5° C. to form large crystals of hydrated disodium phosphate which are filtered off in a filter press.

The filtered resin solution is evaluated as follows.

By weight, percent
Solid content (by drying 2 gm. sample at 150° C.
  for 2 hours) _____ 60
Ash _____ 0.4
Free formaldehyde _____ 5.25
Free phenol _____ 2.50
Solubility in water, by volume: 1 resin:10 water.
Color: Pale amber.
pH, 7.5.

The sludge in the press, containing some resin may be picked up in the next batch. The separated salt solution is treated to recover anhydrous salt for reuse.

EXAMPLE 2

In Example 1, the following changes are made:
Same formaldehyde used at 4500 pounds.
Mass heated to 70° C for reaction.

Resin evaluation: By weight, percent
Solid content _____ 62.00
Ash _____ 0.40
Free formaldehyde _____ 3.00
Free phenol _____ 5.00
Miscible in all proportions with water.
pH=7.5

EXAMPLE 3

In Example 1, the following changes are made:
Same formaldehyde used at 3500 pounds.
Mass heated to 90° C. for reaction.
Time periods: 60 minutes and 30 minutes.

Resin evaluation: By weight, percent
Solid content _____ 62
Ash _____ 0.4
Free formaldehyde _____ 1
Free phenol _____ 10
Miscible in all proportions
  at 25° C. with water.
pH=7.5

EXAMPLE 4

*Non-Stepwise Addition of Caustic Soda Solution*

| Material | Grade | Pounds |
|---|---|---|
| Phenol | U.S.P. | 3,140 |
| Formaldehyde solution, 50% | As in Example 1 | 4,500 |
| Caustic soda solution, 50% | do | 100 |
| Disodium phosphate | Anhydrous | 465 |
| Phosphoric acid solution, 75% | As in Example 1 | 120 |

The phenol and formaldehyde solution are mixed and heated to 75° C. The caustic soda solution is promptly added and the reaction temperature is kept at 75° C.±2° C. by vigorous cooling. After twenty minutes, the reaction subsides and only moderate cooling is necessary to dissipate the heat of reaction. The temperature is maintained at approximately 75° C. for three hours, whereupon, the disodium phosphate is added and the solution is cooled to 38° C. Addition of the phosphoric acid solution raises the temperature slightly and reduces the pH to about 7.80. An aqueous disodium phosphate solution soon settles which is drained off for dehydration and reuse. The supernatant aqueous resin is cooled to below 25° C. to precipitate, as hydrated crystals, most of the soluble sodium phosphate not separated in the liquid phase. The resin is filtered and the separated sludge of crystals with adherent resin is added to the next batch of hot resin for crude separation.

Properties of the filtered resin are:

By weight, percent
Solids (by drying 2-gram sample for 2 hours at
  150° C.) _____ 60
Free formaldehyde _____ 3
pH 7.80
Water solubility, soluble in an equal volume of
  water at 25° C.

EXAMPLE 5

*Use of Low Ratio Formaldehyde to Phenol*

| Material | Grade | Pounds |
|---|---|---|
| Phenol | U.S.P. | 3,140 |
| Formaldehyde solution, 37% [1] | In water | 2,750 |
| Caustic soda solution, 50% | As in Example 1 | 450 |
| Disodium phosphate | Anhydrous | 200 |
| Phosphoric acid solution, 75% | As in Example 1 | 375 |

[1] Contains also 10% to 15% methanol.

The phenol and formaldehyde solution are mixed and heated to 70° C. The caustic soda solution is gradually added over a 60-minute period, maintaining the reaction temperature at 75° C. by gradually applying an increasing amount of cooling medium to the reactor surface. After 30 minutes, the reaction subsides and the cooling is gradually reduced, still keeping the resin reaction at about 75° C. Two hours after beginning the addition of the caustic soda solution the reaction mass is cooled to 60° C. and the anhydrous disodium phosphate is added. Cooling is continued to 35° C. at which point the phosphoric acid solution is added which will raise the temperature to 40° C. and reduce the pH to about 7.50. The neutralized resin readily separates into two liquid phases—a lighter resinous layer containing about 60% resin condensate, 2% disodium phosphate, 26% water, and 12% free phenol; and a heavier salt layer containing 30% sodium phosphate and 70% water.

The resinous layer is separated from the salt layer and cooled to below 25° C. to crystallize most of the hot-soluble sodium phosphate. As the temperature is lowered below 25° C., the greater is the amount of crystals formed. The cooling may go as low as −10° C., before filtering out the resulting crystals. The mass of crystals and adherent resin are then heated to above 36° C. to remelt the crystals which rapidly settle from the adherent resin, and the aqueous melt is drained away for refining into a saleable or reusable grade of disodium phosphate. The recovered resin is added to the filtered batch or to a new batch of resin before filtering.

Typical properties are:

| | By weight, percent |
|---|---|
| Solids | 60 |
| Free formaldehyde | 1 |
| Free phenol | 12 |
| Ash | 0.4 |

Solubility in water at 25° C., miscible.
pH=7.50.

EXAMPLE 6

*Adding Formaldehyde Solution Stepwise to Reaction Mass*

| Material | Grade | Pounds |
|---|---|---|
| Phenol | U.S.P | 3,140 |
| Caustic soda solution, 50% | As in Example 1 | 450 |
| Formaldehyde solution, 50% | do | 5,500 |
| Disodium phosphate | Anhydrous | 320 |
| Phosphoric acid solution, 75% | As in Example 1 | 375 |

The phenol and caustic soda solution are heated to 70° C. and the formaldehyde solution is gradually added over a 60-minute period, keeping the solution at about 70° C. by the gradual application of cooling medium. After two hours, the mass is cooled to 60° C. and the anhydrous disodium phosphate is added. Cooling is continued to 35° C. at which point the phosphoric acid solution is added which will raise the temperature to about 40° C. and reduce the pH to about 7.50. The neutralized resin readily separates into two liquid phases—a lighter aqueous resinous layer containing about 60% resin condensate, 2% disodium phosphate, and less than 2% free phenol, and a heavier salt layer containing 30% sodium phosphate and 70% water.

The resinous phase is separated from the salt phase and cooled below 25° C. to crystallize most of the hot-soluble sodium phosphate. Cooling the solution below 25° C. removes even more phosphate and it is practicable to cool the resin to −5° or −10° C. before filtering out the precipitated crystals. The mass of crystals and adherent resin are heated to above 36° C. to remelt the crystals which rapidly settle from the adherent resin and the aqueous melt is drained away for refining to a saleable or reusable grade of sodium phosphate. The recovered resin is added to the filtered batch or to a new batch of resin before filtering.

Typical properties are:

| | By weight, percent |
|---|---|
| Solids | 60 |
| Ash | 0.4 |
| Free formaldehyde | 5.5 |

Solubility in water at 25° C., 10 volumes water to 1 volume resin.
pH=7.50.

EXAMPLE 7

*Adding Monosodium Phosphate Salt Crystals*

| Material | Grade | Pounds |
|---|---|---|
| Phenol | U.S.P | 3,140 |
| Formaldehyde solution, 50% | As in Example 1 | 5,500 |
| Caustic soda solution, 50% | do | 450 |
| Monosodium phosphate | Anhydrous | 650 |

The phenol and formaldehyde solution are heated and maintained at 75° C. while the caustic soda solution is gradually added over a 100-minute period. When the caustic soda solution is all in, the mass is cooled to 30° C. and the monosodium phosphate is added. The monosodium phosphate may be added before cooling although this is not the preferred practice. The temperature is kept just high enough to prevent crystallizing of the sodium phosphate which occurs at about 34° C., unless special precautions are taken to induce supercooling, in which case the temperature can be lowered to 29° to 30° C. before crystallization sets in. Higher temperature than that necessary to prevent crystallization increases the solubility of disodium phosphate in the resin phase and makes for a greater amount of salt to be removed from the final product. Higher temperature also tends to advance the resin towards insolubility and for this reason the temperature during separation should not be excessive.

After the temperature during separation is adjusted, the liquid phases are separated and the two layers are further processed as set forth in the preceding examples.

Typical properties are:

| | By weight, percent |
|---|---|
| Solids | 60 |
| Ash | 0.4 |
| Free formaldehyde | 5.5 |

Solubility in water at 25° C., 10 volumes water to 1 volume resin.
pH=7.50.

EXAMPLE 8

*High Ratio Formaldehyde to Phenol*

| Material | Grade | Pounds |
|---|---|---|
| Phenol | U.S.P | 3,140 |
| Formaldehyde solution, 50% | As in Example 1 | 6,000 |
| Caustic soda solution, 50% | do | 450 |
| Phosphoric acid, 75% | do | 375 |
| Disodium phosphate | Anhydrous | 400 |

The phenol and formaldehyde solution are heated and maintained at 75° C. while the caustic soda solution is gradually added over a 100-minute period. The temperature is kept at 75° C. for an additional 30 minutes and then cooled to 60° C., after which the disodium phosphate is added. The batch is further cooled to 35° C. and neutralized with the phosphoric acid. The aqueous resin is separated from the aqueous salt and each phase is refined as described in Example 2.

Typical properties are:

| | By weight, percent |
|---|---|
| Solids | 60 |
| Free formaldehyde | 8 |
| Ash | .4 |

Solubility in water at 25° C., 4 volumes water to 1 volume resin.
pH=7.50.

EXAMPLE 9

Use of Hydrated Sodium Phosphate in Lieu of Anhydrous Grade

Other examples use anhydrous disodium phosphate but it is not necessary to have the salt completely dry in order to function as a dewatering agent. In this example, the extracting medium is aqueous disodium phosphate of 35% concentration. This can be readily prepared by taking the 29% to 30% crude salt from previous extractions and chilling to crystallize the primary hydrate $$(Na_2HPO_4 \cdot 12H_2O)$$

which contains about 39% dry salt. When these crystals are rinsed with fresh water, the mass will contain 35% to 38% dry salt, depending upon how well the adherent wash water is removed.

| Material | Grade | Pounds |
|---|---|---|
| Phenol | U.S.P | 3,140 |
| Formaldehyde solution, 50% | As in Example 1 | 4,500 |
| Caustic soda solution, 50% | ----do---- | 450 |
| Disodium phosphate solution | 35% salt | 1,400 |
| Phosphoric acid solution, 75% | As in Example 1 | 375 |

The reaction condition and process steps are the same as outlined in Example 2, except that aqueous disodium phosphate is used in lieu of the anhydrous grade.

Typical properties are:

|  | By weight, percent |
|---|---|
| Solids | 60 |
| Free formaldehyde | 3 |
| Free phenol | 5 |
| Ash | 0.4 |

Solubility in water at 25° C., miscible.
pH=7.5.

EXAMPLE 10

Use of Excessive Acid and Caustic With Strong Formaldehyde in Lieu of Disodium Phosphate

| Material | Grade | Pounds |
|---|---|---|
| Phenol | U.S.P | 3,140 |
| Formaldehyde solution, 50% | As in Example 1 | 3,200 |
| Caustic soda solution, 50% | ----do---- | 500 |
| Phosphoric acid solution, 75% | ----do---- | 415 |

The phenol and formaldehyde are mixed and heated to 75° C. The caustic solution is gradually added over a 60-minute period and the temperature is kept at 75° C. for a total of 100 minutes. The solution is partly cooled and the acid added to adjust the pH to 7.50 and the temperature to 40° C. The two resulting phases are separated and processed as described in Example 2.

Typical properties are:

|  | By weight, percent |
|---|---|
| Solids | 60 |
| Free formaldehyde | 1.0 |
| Free phenol | 12.5 |
| Ash | 0.4 |

Solubility in water at 25° C. miscible.

EXAMPLE 11

Use of Excessive Acid and Caustic With Weak Formaldehyde in Lieu of Disodium Phosphate

| Material | Grade | Pounds |
|---|---|---|
| Phenol | U.S.P | 3,140 |
| Formaldehyde solution | 37% in water | 5,500 |
| Caustic soda solution, 50% | As in Example 1 | 1,335 |
| Phosphoric acid solution, 75% | ----do---- | 1,100 |

The phenol and formaldehyde are mixed and heated to 50° C. The caustic soda solution is added gradually over a six hour period, keeping the temperature at 50° C. Phosphoric acid is added and the batch is adjusted to 40° C. by applying high vacuum evaporative cooling. Additional disodium phosphate is not necessary because of the large amount formed by neutralizing the caustic soda catalyst. The heavy salt layer is separated from the lighter aqueous resin layer and each phase is processed as described in Example 2. The resulting product is similar to those previously described.

EXAMPLE 12

| Material | Grade | Pounds |
|---|---|---|
| Phenol | U.S.P | 3,140 |
| Formaldehyde solution, 50% | As in Example 1 | 3,000 |
| Caustic soda solution, 50% | ----do---- | 62.8 |
| Disodium phosphate | Anhydrous | 1,000 |

The phenol and formaldehyde solution are heated to 90° C. and the caustic soda solution is added gradually over a 60-minute period. The temperature is held at 90° C. for another 45 minutes. The mass is cooled to 80° C., then the anhydrous disodium phosphate is added and thoroughly mixed until two liquid phases develop which can be separated by decanting. The equilibrium pH is about 9.0. The heavier salt solution layer melts at 60° C. and contains about 7 moles of disodium phosphate with about .023 mole of trisodium phosphate and is remarkably free of resin. By the phase formation the resin mass is increased in resin concentration from about 55% to about 72% resin solids. When the resin phase is cooled to 0° to 10° C., additional sodium phosphate crystallizes out and is removed by filtration.

EXAMPLE 13

| Material | Grade | Pounds |
|---|---|---|
| Phenol | U.S.P | 3,140 |
| Formaledhyde solution, 50% | As in Example 1 | 1,500 |
| Caustic soda solution, 50% | ----do---- | 240 |
| Monosodium phosphate | Anhydrous | 360 |

The phenol and formaldehyde solution are heated to 90° C. and the caustic soda solution is added gradually over a 60-minute period. The mass is then cooled to 50° C. and the monosodium phosphate is added. After brief stirring the two phases form, and are separated by draining off the heavier salt layer is a cone-bottom tank. The pH is approximately 7.6. The resin solution is slowly heat-reactive, and faster conversion may be attained by adding 10% (based on solids) of hexamethylenetetramine.

An efficient phase separation takes place on reducing the pH of the condensation mass to 9 or below, and this is preferably accomplished with an agent providing the orthophosphoric acid radical —PO₄. However, for many end uses, the most desirable pH range is 7.0 to 7.6 and for convenience this range is often used in conducting the phase separation. The lower the pH the more efficient is the phase separation, being at its maximum at about pH of 4.5 or less. Where a resin pH is desired higher or lower than that effected during the phase separation, a suitable agent may be added afterward, such as caustic soda for raising it or phosphoric acid or an acid sodium phosphate for lowering it. Such acidic agent need not have the phosphate radical. Acids such as hydrochloric acid (36%), granulated boric acid and lactic acid (50%) may be used. These may be used along with the selected orthophosphate salts before phase separation, but such use complicates the recovery and recycling of phosphate salts. When such acids are used with orthophosphate salts, there are new equilibriums set up involving the acid. For example, hydrochloric acid will change some disodium phosphate to monosodium phosphate and sodium chloride.

In the foregoing examples there is a wide variation in kinds and quantities of the materials selected from the recited group, for the purpose of forming an adequately concentrated solution of a salt which is preferably predominantly disodium phosphate, to function as dewatering agent for a resulting resin-containing liquid phase of pH lowered from that of the condensation reaction. The salt solution to be formed may be expressed substantially as the moles of $Na_2O$ therein to the moles of water thereof derived from the original ingredients. The following Table I gives these amounts for the examples.

TABLE I

| Example | Materials Selected | | Moles $Na_2O$ Per Mole Phenol | Moles $H_2O$ Per Mole $Na_2O$ |
|---|---|---|---|---|
| | Group I | Group II | | |
| 1 | $Na_2HPO_4$ | Aq. $H_3PO_4$ | 0.137 | 37.2 |
| 2 | $Na_2HPO_4$ | Aq. $H_3PO_4$ | .137 | 31.2 |
| 3 | $Na_2HPO_4$ | Aq. $H_3PO_4$ | .137 | 25.1 |
| 4 | $Na_2HPO_4$ | Aq. $H_3PO_4$ | .118 | 33.1 |
| 5 | $Na_2HPO_4$ | Aq. $H_3PO_4$ | .126 | 27.0 |
| 6 | $Na_2HPO_4$ | Aq. $H_3PO_4$ | .152 | 33.7 |
| 7 | $NaH_2PO_4$ | 0 | .165 | 29.3 |
| 8 | $Na_2HPO_4$ | Aq. $H_3PO_4$ | .168 | 32.7 |
| 9 | Aq. $Na_2HPO_4$ | Aq. $H_3PO_4$ | .188 | 30.8 |
| 10 | 0 | Aq. $H_3PO_4$ | .094 | 34.5 |
| 11 | 0 | Aq. $H_3PO_4$ | .250 | 29.3 |
| 12 | $Na_2HPO_4$ | 0 | .255 | 11.6 |
| 13 | $NaH_2PO_4$ | 0 | .09 | 16.1 |

The most concentrated combination for forming an aqueous phase in Table I is that of Example 12, which corresponds to about 34.5 parts of $Na_2HPO_4$, 5.1 parts of $Na_3PO_4$ and 60.5 parts of water. The most dilute one is that of Example 1, corresponding to 16 parts of $Na_2HPO_4$, 1 part of $Na_3PO_4$ and 83 parts of water. The composition $Na_2HPO_4.12H_2O$ corresponds to 40 parts of $Na_2HPO_4$ to 60 parts of $H_2O$. The more concentrated the salt substance, the more dehydrated may be the resin phase. Anhydrous salt is accordingly preferred.

The great advantage of disodium phosphate as the salt is the low temperature at which $12H_2O$-hydrate crystallizes, and the ease with which such hydrate may be converted to anhydrous form for reuse. Thus, the dehydration by volatilization is really practiced on the salt, rather than on the resin.

Because of the lower crystallization temperature, it is preferred to practice the invention by producing solutions to form the dodecahydrate. An additional reason for this preference is that more water is removed per unit of disodium phosphate. However, it is to be understood that by increasing the proportion of disodium phosphate to water in the aqueous phase, for example, to form the heptahydrate or the dihydrate, the crystallization temperature will be in the range 95° to 48° C. for the dihydrate or in the range 48° to 34.6° for the heptahydrate. When the resin phase is separated from the original aqueous phase, it is preferred to make the separation before crystallization begins. Accordingly, the content of disodium phosphate in the original aqueous phase predetermines the lower limit for cooling the reaction mass when the original aqueous phase is liquid for the purpose of isolating the resin phase.

Example 12 illustrates the use of disodium phosphate for effecting crystallization with less than 12 molecules of water. The heavy salt layer forms crystals at about 60° C., which are less hydrated than the dodecahydrate, and which contain about 55% anhydrous salt. When the resin layer is dehydrated to a relatively high solid content, such as described in Example 12, the temperature is kept above 60° C. to assure fluidity of the partially hydrated salt. The higher temperature is also desired to reduce the viscosity of the resin which has become thickened by its loss of water and thus promote rapid settling of the liquid salt from the resin phase.

The following examples illustrate modifications to lessen the amount of disodium phosphate and to increase the amount of monosodium phosphate in the salt layer. This is accompanied by lowered pH to a limit of about 4 corresponding to $NaH_2PO_4$. The phase separation is more efficient as the pH is lowered, and in some cases it may be necessary to raise the pH of the resin layer to a value in the range from 5.5 to 9, depending upon the phosphate salt present, when removal of salt therefrom is to be effected as crystals.

EXAMPLE 14

In Example 1, the amount of 75% phosphoric acid used to lower the pH is increased to 420 pounds, resulting in a pH of 5.5 and in a mixture of disodium phosphate and monosodium phosphate. The remaining procedure is the same. The resin product is as follows:

By weight, percent
Solid content _____ 62.0
Free phenol _____ 2.7
Free formaldehyde _____ 5.5
Solubility in water by volume: 1 resin:5 water.
pH=5.5.

EXAMPLE 15

In Example 1, the amount of 75% phosphoric acid is increased to 733 pounds, resulting in an aqueous layer of pH of 4.4 and a resin-containing layer at pH of 4.8. After separating the two liquid phases, the pH of the resin layer is increased to 5.5 by adding aqueous 50% sodium hydroxide solution. Then the resin layer is cooled to at least 40° F. and after 24 to 48 hours, crystals of hydrated phosphate salt of sodium form. On separation, the liquid resin will have dropped to a pH of 5.0 and a solid content of 61.3%.

EXAMPLE 16

In Example 15, the isolated resin layer is not increased in its pH, so that on cooling to 40° F. or less, there is a second phase formation including an aqueous syrupy phase of phosphate salt of sodium largely monosodium phosphate. The phases are separated by centrifuging. The resin phase has a solid content of 61.1% and a pH of 4.0.

EXAMPLE 17

In Example 7, the monosodium phosphate is changed to the same quantity of monosodium sulfate for conversion to sodium sulfate, which crystallizes with 10 molecules of water at 32.4° C. The procedure is the same and the same conditions as to temperature apply as in Example 7. After the separation of the two liquid phases, the resin phase is cooled quickly to 15° to 25° C. and then slowly to 0° to 5° C. and crystals of hydrated sodium sulfate form. The resulting resin phase is about 60% solids, and is soluble in water, has a pale amber color, has a pH of about 7.5, and reacts with heat to an insoluble resin.

EXAMPLE 18

In Example 1, after isolating the resin phase from the phosphate solution, 360 pounds of anhydrous sodium sulfate are added to the resin phase, and the mass cooled to a temperature in the range from 40° to 50° C. This effects a second formation of two liquid phases. Then the resin phase is isolated and cooled quickly to a temperature in the range 15° to 25° C. and then slowly to 0° to 5° C. forming large crystals of $Na_2SO_4.10H_2O$. These are filtered from the remaining liquid resin. The solids content is about 62% and pH about 7.6.

The invention is not limited to the detailed procedure given. For example, the phase separation of the original condensation mass by salting out may be conducted at a relatively higher pH, for example 7, and the resin layer isolated. Then this layer may be subjected to phase separation by acidifying to a lower pH or by adding more salt, or both, to form a heavy salting out layer of lower pH which may be used in another batch to neutralize catalyst.

A great advantage of the invention is preservation from loss of the volatile phenol and formaldehyde in the initial condensation mass. Not only is expensive phenol preserved in the final product up to about 99.9%, compared with conventional loss of 2% to 5% or more in dewatering by vacuum distillation, but the chemical constitution, or resin character, is controlled and made uniform from batch to batch, by avoiding advancement of the resin which takes place during prolonged vacuum dewatering. Accordingly, this feature of the invention is useful with any aqueous condensation product of phenol and formaldehyde.

However, to add to the benefits of the dewatering by salt, the condensation itself is carried on in a novel manner by precise control in part permitted by the slow introduction of the caustic soda in a measured period in a time-controlled reaction.

Resins of the character described have been highly successful as adhesive in making mineral wool and glass wool felts, wherein the loss of resin by volatility is greatly lessened compared to other liquid resins suitable for this use.

The resins are useful in bonding sand for foundry cores, for shell molds in casting metals, for treating wood for anti-shrink properties, for impregnating wood especially veneer, paper and other materials.

The processes herein described have advantages in producing resin of improved quality, and in economy as to costs of materials and operations. The step of dewatering by heat is changed from heating the mass containing the resin to heating the substance of the hydrated salt crystals which have taken the water from the aqueous resin. Thereby the salt may be reused. Also, the cleaning of the sludge of crystals recovered from the cooled resin, to recover adherent resin, by combining with a fresh batch of aqueous resin, in an important economy.

When more than three moles of formaldehyde per mole of phenol are used, no advantage is obtained as far as the resin quality is concerned, and the ratio of 3 to 1 is, therefore, only an economic limit. Since the examples given are intended to be those of economic value, it is to be understood that the invention may be carried out with numerous modifications, without benefit of the economies. For example, by salting out to effect phase-formation by providing in the initially homogeneous reaction mass a content of salt which dewaters by the mechanism of forming hydrated crystals, economies dictate the choice and amount of additive to secure efficient phase-formation and high degrees of dewatering. Therefore, it is to be understood that the invention may be practiced in less efficient degree by changing the selection and amount of material added to the reaction mass, as comprehended within the scope of the invention expressed in the appended claims.

I claim:

1. The method which comprises condensing an aqueous mixture containing 1 mole of phenol and from .75 to 3 moles of formaldehyde in the presence of sodium hydroxide as catalyst and forming thereby an aqueous solution of a phenol-formaldehyde condensation product, subjecting the said solution at a temperature above 30° C. to the action of material in quantity to form a mass consisting of two liquid phases of which the upper phase is an aqueous solution more concentrated with respect to said condensation product at an equilibrium pH in the range from 5.5 to 9, said material being selected from the group consisting of orthophosphoric acid, monosodium phosphate, disodium phosphate and aqueous solutions of each, the material so selected being such in number, kind and quantity as to provide at least approximately 16 parts by weight of anhydrous disodium phosphate to 83 parts of total water entering the two-phase mass as ingredients therefor, being such as to provide the said pH, and being such as to provide at least .09 mole of $Na_2O$ per mole of phenol used, separating the upper resin-carrying phase in its liquid form from the material of the lower phase, chilling the upper resin-carrying phase to form disodium phosphate crystals therein, and separating the resulting chilled resin solution from said crystals.

2. The method which comprises condensing an aqueous mixture containing 1 mole of phenol and from 1.5 to 2.75 moles of formaldehyde in the presence of sodium hydroxide as catalyst and forming thereby an aqueous solution of a phenol-formaldehyde condensation product, subjecting the said solution at a temperature above 30° C. to the action of material in quantity to form a mass consisting of two liquid phases of which the upper phase is an aqueous solution more concentrated with respect to said condensation product at an equilibrium pH in the range from 5.5 to 9, said material being selected from the group consisting of orthophosphoric acid, monosodium phosphate, disodium phosphate and aqueous solutions of each, the material so selected being such in number, kind and quantity as to provide at least approximately 16 parts by weight of anhydrous disodium phosphate to 83 parts of total water entering the two-phase mass as ingredients therefor, being such as to provide the said pH, and being such as to provide at least .09 mole of $Na_2O$ per mole of phenol used, separating the upper resin-carrying phase in its liquid form from the material of the lower phase, chilling the upper resin-carrying phase to form disodium phosphate crystals therein, and separating the resulting chilled resin solution from said crystals.

3. The method which comprises condensing an aqueous mixture containing 1 mole of phenol and from .75 to 3 moles of formaldehyde in the presence of sodium hydroxide as catalyst and forming thereby an aqueous solution of a phenol-formaldehyde condensation product, subjecting the said solution thereof at a temperature above 30° C. to the action of material in quantity to form a mass consisting of two liquid phases of which the upper phase is an aqueous solution more concentrated with respect to said condensation product at an equilibrium pH in the range from 5.5 to 9, said material including essentially orthophosphoric acid and anhydrous disodium phosphate crystals, said material being used in quantity to provide at least approximately 16 parts by weight of anhydrous disodium phosphate to 83 parts of total water entering the two-phase mass as ingredients therefor, to provide the said pH and to provide at least .09 mole of $Na_2O$ per mole of phenol used, separating the upper resin-carrying phase in its liquid form from the material of the lower phase, chilling the upper resin-carrying phase to form disodium phosphate crystals therein, and separating the resulting chilled resin solution from said crystals.

4. The method which comprises condensing an aqueous mixture containing 1 mole of phenol and from .75 to 3 moles of formaldehyde in the presence of sodium hydroxide as catalyst and forming thereby an aqueous solution of a phenol-formaldehyde condensation product, subjecting the said solution thereof at a temperature above 30° C. to the action of material in quantity to form a mass consisting of two liquid phases of which the upper phase is an aqueous solution more concentrated with respect to said condensation product at an equilibrium pH in the range from 5.5 to 9, said material including essentially an acidic compound of orthophosphoric acid and anhydrous disodium phosphate crystals, said material being used in quantity to provide at least approximately 16 parts by weight of anhydrous disodium phosphate to 83 parts of total water entering the two-phase mass as ingredients therefor, to provide the said pH and to provide at least .09 mole of $Na_2O$ per mole of phenol used, separating the upper resin-carrying phase in its liquid form from the material of the lower phase, chilling the upper resin-carrying phase to form disodium phosphate crystals therein, and separating the resulting chilled resin solution from said crystals.

5. The method which comprises condensing an aqueous mixture containing 1 mole of phenol and from .75 to 3 moles of formaldehyde in the presence of sodium hydroxide as catalyst and forming thereby an aqueous solution of a phenol-formaldehyde condensation product, subjecting the said solution at a temperature above 30° C. to the action of material in quantity to form a mass consisting of two liquid phases of which the upper phase is an aqueous solution more concentrated with respect to said condensation product at an equilibrium pH in the range from 5.5 to 9, said material consisting of aqueous orthophosphoric acid of character to provide at least approximately 16 parts by weight of anhydrous disodium phosphate to 83 parts of total water entering the two-phase mass as ingredients therefor, being such as to provide the said pH, and being such as to provide at least .09 mole of $Na_2O$ per mole of phenol used, separating the upper resin-carrying phase in its liquid form from the material of the lower phase, chilling the upper resin-carrying phase to form disodium phosphate crystals therein, and separating the resulting chilled resin solution from said crystals.

6. The method which comprises condensing an aqueous mixture containing 1 mole of phenol and from 1.5 to 2.75 moles of formaldehyde in the presence of sodium hydroxide as catalyst and forming thereby an aqueous solution of a phenol-formaldehyde condensation product, subjecting the said solution at a temperature above 30° C. to the action of material in quantity to form a mass consisting of two liquid phases of which the upper phase is an aqueous solution more concentrated with respect to said condensation product at an equilibrium pH in the range from 5.5 to 9, said material including essentially orthophosphoric acid and anhydrous disodium phosphate crystals, said material being used in quantity to provide at least approximately 16 parts by weight of anhydrous disodium phosphate to 83 parts of total water entering the two-phase mass as ingredients therefor, to provide the said pH and to provide at least .09 mole of $Na_2O$ per mole of phenol used, separating the upper resin-carrying phase in its liquid form from the material of the lower phase, chilling the upper resin-carrying phase to form disodium phosphate crystals therein, and separating the resulting chilled resin solution from said crystals.

7. The method which comprises condensing an aqueous mixture containing 1 mole of phenol and from 1.5 to 2.75 moles of formaldehyde in the presence of sodium hydroxide as catalyst and forming thereby an aqueous solution of a phenol-formaldehyde condensation product, subjecting the said solution at a temperature above 30° C. to the action of material in quantity to form a mass consisting of two liquid phases of which the upper phase is an aqueous solution more concentrated with respect to said condensation product at an equilibrium pH in the range from 5.5 to 9, said material including essentially an acidic compound of orthophosphoric acid and anhydrous disodium phosphate crystals, said material being used in quantity to provide at least approximately 16 parts by weight of anhydrous disodium phosphate to 83 parts of total water entering the two-phase mass as ingredients therefor, to provide the said pH, and to provide at least .09 mole of $Na_2O$ per mole of phenol used, separating the upper resin-carrying phase in its liquid form from the material of the lower phase, chilling the upper resin-carrying phase to form disodium phosphate crystals therein, and separating the resulting chilled resin solution from said crystals.

8. The method which comprises condensing an aqueous mixture containing 1 mole of phenol and from 1.5 to 2.75 moles of formaldehyde in the presence of sodium hydroxide as catalyst and forming thereby an aqueous solution of a phenol-formaldehyde condensation product, subjecting the said solution at a temperature above 30° C. to the action of material in quantity to form a mass consisting of two liquid phases of which the upper phase is an aqueous solution more concentrated with respect to said condensation product at an equilibrium pH in the range from 5.5 to 9, said material consisting of aqueous orthophosphoric acid of character to provide at least approximately 16 parts by weight of anhydrous disodium phosphate to 83 parts of total water entering the two-phase mass as ingredients therefor, being such as to provide the said pH, and being such as to provide at least .09 mole of $Na_2O$ per mole of phenol used, separating the upper resin-carrying phase in its liquid form from the material of the lower phase, chilling the upper resin-carrying phase to form disodium phosphate crystals therein, and separating the resulting chilled resin solution from said crystals.

9. The method which comprises condensing an aqueous mixture containing 1 mole of phenol and from 0.75 to 3 moles of formaldehyde in the presence of .023 to .5 mole of caustic soda as catalyst in an aqueous medium, adding thereto material reactive with caustic soda selected from the group consisting of orthophosphoric acid, monosodium phosphate, disodium phosphate and aqueous solutions of each, the material so selected being such in number, kind and quantity and being used at a temperature above 30° C. to form a mass consisting of two liquid phases having an equilibrium pH in the range from 5.5 to 9, to provide at least in part by the resulting chemical reaction involving the caustic soda catalyst at least approximately 16 parts by weight of anhydrous disodium phosphate to 83 parts of total water accompanying the ingredients providing the two-phase mass and to provide at least .09 mole of $Na_2O$ per mole of phenol, whereby a readily separable liquid resin-carrying phase contains minor amounts of phosphate salt and of water and the remaining aqueous phase is a substantially resin-free disodium phosphate salt solution, separating the upper resin-carrying phase in its liquid form from the material of the lower phase, chilling the resin-carrying phase to form disodium phosphate crystals therein, and separating the resulting chilled resin solution from said crystals.

10. The method which comprises condensing an aqueous mixture containing 1 mole of phenol and from 0.75 to 3 moles of formaldehyde in the presence of .023 to .5 mole of caustic soda as catalyst in an aqueous medium, adding thereto a crystal form of monosodium phosphate in quantity and at a temperature above 30° C. to form a mass consisting of two liquid phases having an equilibrium pH in the range from 5.5 to 9, to provide at least in part by the resulting chemical reaction involving the caustic soda catalyst at least approximately 16 parts by weight of anhydrous disodium phosphate to 83 parts of total water accompanying the ingredients providing the two-phase mass and to provide at least .09 mole of $Na_2O$ per mole of phenol, whereby a readily separable liquid resin-carrying phase contains minor amounts of phosphate salt and of water and the remaining aqueous phase is a substantially resin-free disodium phosphate salt solution, separating the upper resin-carrying phase in its liquid form from the material of the lower phase, chilling the resin-carrying phase to form disodium phosphate crystals, and separating the resulting chilled resin solution from said crystals.

11. The method which comprises condensing an aqueous mixture containing 1 mole of phenol and from 0.75 to 3 moles of formaldehyde in the presence of .023 to .5 mole of caustic soda as catalyst in an aqueous medium, adding thereto material including essentially orthophosphoric acid and anhydrous disodium phosphate crystals, said material being used in quantity at a temperature above 30° C. to form a mass consisting of two liquid phases having an equilibrium pH in the range from 5.5 to 9, to provide at least in part by the resulting chemical reaction involving the caustic soda catalyst at least approximately 16 parts by weight of anhydrous disodium phosphate to 83 parts of total water accompanying the ingredients providing the two-phase mass, and to provide at least .09 mole of $Na_2O$ per mole of phenol, whereby a readily separable liquid resin-carrying phase contains minor amounts of phosphate salt and of water and the remaining aqueous phase is a substantially resin-free disodium phosphate salt solution, separating the upper resin-carrying phase in its liquid form from the material of the lower phase, chilling the resin-carrying phase to form disodium phosphate crystals, and separating the resulting chilled resin solution from said crystals.

12. The method which comprises condensing an aqueous mixture containing 1 mole of phenol and from 0.75 to 3 moles of formaldehyde in the presence of .023 to .5 mole of caustic soda as catalyst in an aqueous medium, adding thereto material including essentially an acidic compound of orthophosphoric acid and anhydrous disodium phosphate crystals, said material being used in quantity at a temperature above 30° C. to form a mass consisting of two liquid phases having an equilibrium pH in the range from 5.5 to 9, and to provide at least in part by the resulting chemical reaction involving the caustic soda catalyst at least approximately 16 parts by weight of anhydrous disodium phosphate to 83 parts of total water accompanying the ingredients providing the two-phase mass, and to provide at least .09 mole of $Na_2O$ per mole of phenol, whereby a readily separable liquid resin-carrying phase contains minor amounts of phosphate salt and of water and the remaining aqueous phase is a substantially resin-free disodium phosphate salt solution, separating the upper resin-carrying phase in its liquid form from the material of the lower phase, chilling the resin-carrying phase to form disodium phosphate crystals, and separating the resulting chilled resin solution from said crystals.

13. The method which comprises slowly introducing from .023 to .5 mole of caustic soda catalyst in aqueous solution into a condensing aqueous mass at a substantially constant condensing temperature, which mass contains from 0.75 to 3 moles of formaldehyde and one mole of phenol, adding to the resulting condensation mass material reactive with caustic soda selected from the group consisting of orthophosphoric acid, monosodium phosphate, disodium phosphate and aqueous solutions of each, the material so selected being such in number, kind and quantity and being used at a temperature above 30° C. to form a mass consisting of two liquid phases having an equilibrium pH in the range from 5.5 to 9, to provide at least in part by the resulting chemical reaction involving the caustic soda catalyst at least approximately 16 parts by weight of anhydrous disodium phosphate to 83 parts of total water accompanying the ingredients providing the two-phase mass and to provide at least .09 mole of $Na_2O$ per mole of phenol, whereby a readily separable liquid resin-carrying phase contains minor amounts of phosphate salt and of water and the remaining aqueous phase is a substantially resin-free disodium phosphate salt solution, separating the upper resin-carrying phase in its liquid form from the material of the lower phase, chilling the resin-carrying phase to form disodium phosphate crystals therein, and separating the resulting chilled resin solution from said crystals.

14. The method which comprises slowly introducing from .023 to .5 mole of caustic soda catalyst in aqueous solution into a condensing aqueous mass at a substantially constant condensing temperature, which mass contains from 0.75 to 3 moles of formaldehyde and one mole of phenol, adding to the resulting condensation mass a crystal form of monosodium phosphate in quantity and at a temperature above 30° C. to form a mass consisting of two liquid phases having an equilibrium pH in the range from 5.5 to 9, to provide at least in part by the resulting chemical reaction involving the caustic soda catalyst at least approximately 16 parts by weight of anhydrous disodium phosphate to 83 parts of total water accompanying the ingredients providing the two-phase mass and to provide at least .09 mole of $Na_2O$ per mole of phenol, whereby a readily separable liquid resin-carrying phase contains minor amounts of phosphate salt and of water and the remaining aqueous phase is a substantially resin-free disodium phosphate salt solution, separating the upper resin-carrying phase in its liquid form from the material of the lower phase, chilling the resin-carrying phase, and separating the resulting chilled resin solution from said crystals.

15. The method which comprises slowly introducing from .023 to .5 mole of caustic soda catalyst in aqueous solution into a condensing aqueous mass at a substantially constant condensing temperature, which mass contains from 0.75 to 3 moles of formaldehyde and one mole of phenol, adding to the resulting condensation mass material including essentially orthophosphoric acid and anhydrous disodium phosphate crystals, said material being used in quantity at a temperature above 30° C. to form a mass consisting of two liquid phases having an equilibrium pH in the range from 5.5 to 9, to provide at least in part by the resulting chemical reaction involving the caustic soda catalyst at least approximately 16 parts by weight of anhydrous disodium phosphate to 83 parts of total water accompanying the ingredients providing the two-phase mass and to provide at least .09 mole of $Na_2O$ per mole of phenol, whereby a readily separable liquid resin phase contains minor amounts of phosphate salt and of water and the remaining aqueous phase is a substantially resin-free disodium phosphate salt solution, separating the upper resin-carrying phase in its liquid form from the material of the lower phase, chilling the resin-carrying phase to form crystals of disodium phosphate, and separating the resulting chilled resin solution from said crystals.

16. The method which comprises slowly introducing from 0.23 to .5 mole of caustic soda catalyst into a condensing aqueous mass at a substantially constant condensing temperature, which mass contains from 0.75 to 3 moles of formaldehyde and one mole of phenol, adding to the resulting condensation mass material including essentially an acidic compound of orthophosphoric acid and anhydrous disodium phosphate crystals, said material being used in quantity at a temperature above 30° C. to form a mass consisting of two liquid phases having an equilibrium pH in the range from 5.5 to 9, to provide at least in part by the resulting chemical reaction involving the caustic soda catalyst at least approximately 16 parts by weight of anhydrous disodium phosphate to 83 parts of total water accompanying the ingredients providing the two-phase mass and to provide at least .09 mole of $Na_2O$ per mole of phenol, whereby a readily separable liquid resin phase contains minor amounts of phosphate salt and of water and the remaining aqeous phase is a substantially resin-free disodium phosphate salt solution, separating the upper resin-carrying phase in its liquid form from the material of the lower phase, chilling the resin-carrying phase to form crystals of disodium phosphate, and separating the resulting chilled resin solution from said crystals.

17. The method which comprises condensing an aqueous mixture containing 1 mole of phenol and from .75 to 3 moles of formaldehyde in the presence of sodium hydroxide as catalyst and forming thereby an aqueous solution of a phenol-formaldehyde condensation product, subjecting the said solution thereof at a temperature above 30° C. to the action of material in quantity to form a mass consisting of two liquid phases of which the upper phase is an aqueous solution more concentrated with respect to said condensation product at a pH in the range from 5.5 to 9, said material consisting of an agent to impart said pH and a form of disodium phosphate having less water than its 12-$H_2O$ crystal form and being such in kind and quantity as to provide at least approximately 16 parts by weight of anhydrous disodium phosphate to 83 parts of total water entering the two-phase mass as ingredients therefor, and being such as to provide at least .09 mole of $Na_2O$ per mole of phenol used, separating the upper resin-carrying phase in its liquid form from the material of the lower phase, chilling the upper resin-carrying phase to form disodium phosphate crystals therein, and separating the resulting resin solution from said crystals.

18. The method which comprises condensing an aqueous mixture containing 1 mole of phenol and from 1.5 to 2.75 moles of formaldehyde in the presence of sodium hydroxide as catalyst and forming thereby an aqueous solution of a phenol-formaldehyde condensation product, subjecting the said solution thereof at a temperature above 30° C. to the action of material in quantity to form a mass consisting of two liquid phases of which the upper phase is an aqueous solution more concentrated with respect to said condensation product at a pH in the range from 5.5 to 9, said material consisting of an agent to impart said pH and a form of disodium phosphate having less water than its 12-$H_2O$ crystal form and being such in kind and quantity as to provide at least approximately 16 parts by weight of anhydrous disodium phosphate to 83 parts of total water entering the two-phase mass as ingredients therefor, and being such as to provide at least .09 mole of $Na_2O$ per mole of phenol used, separating the upper resin-carrying phase in its liquid form from the material of the lower phase, chilling the upper resin-carrying phase to form disodium phosphate crystals therein, and separating the resulting resin solution from said crystals.

19. The method which comprises condensing an aqueous mixture containing 1 mole of phenol and from .75 to 3 moles of formaldehyde in the presence of sodium hydroxide as catalyst and forming thereby an aqueous solution of a phenol-formaldehyde condensation product, subjecting the said solution at a temperature above 30° C. to the action of material in quantity to form a mass consisting of two liquid phases at a pH in the aqueous phase in the range from 4 to 9 of which mass the upper phase is a resinous solution more concentrated with respect to said condensation product, said material being selected from the group consisting of orthophosphoric acid, monosodium phosphate, disodium phosphate and aqueous solutions of each, the material so selected being such in number, kind and quantity as to provide in the upper liquid phase a quantity of phosphate salt of sodium which is crystallizable in the hereinafter recited chilling of said upper phase, separating the upper liquid phase in its liquid form from the material of the lower phase, chilling the separated upper liquid phase at a pH of at least 5.5 to form a sludge containing hydrated crystals of phosphate salt of sodium, separating the resulting chilled resin-containing liquid from the sludge, and combining the sludge comprising said crystals as a portion of the selected material with another quantity of said aqueous solution of said condensation product for subsequent phase-formation.

20. The method which comprises condensing an aqueous mixture containing 1 mole of phenol and from .75 to 3 moles of formaldehyde in the presence of sodium hydroxide as catalyst and forming thereby an aqueous solution of a phenol-formaldehyde condensation product, subjecting the said solution at a temperature above 30° C. to the action of material in quantity to form a mass consisting of two liquid phases at a pH in the aqueous phase in the range from 4 to 9 of which mass the upper phase is a resinous solution more concentrated with respect to said condensation product, said material being selected from the group consisting of orthophosphoric acid, monosodium phosphate, disodium phosphate and aqueous solutions of each, the material so selected being such in number, kind and quantity as to provide in the upper liquid phase a quantity of phosphate salt of sodium which is crystallizable in the hereinafter recited chilling of said upper phase, separating the upper liquid phase in its liquid form from the material of the lower phase, chilling the separated upper liquid phase to form two phases including a phase containing phosphate salt of sodium and a resin containing liquid, and separating the resin-containing liquid from the salt-containing phase.

21. In the process of removing water from individual batches in a succession of batches of an aqueous resin-containing condensation mass of caustic soda, phenol and formaldehyde by the neutralization of the caustic soda therein and by the formation of two aqueous liquid phases each containing in solution sodium phosphate salt, the steps of separating the liquid phases, forming hydrated crystals of sodium acid phosphate in the separated upper resin-containing phase by chilling said phase, separating the liquid from the sludge containing said crystals, and combining the contents of the sludge with a succeeding batch of such an aqueous resin-containing condensation mass of phenol and formaldehyde, whereby to recover resin content of said sludge.

22. The method of dewatering a homogeneous aqueous alkaline-catlyzed condensation mass of caustic soda, phenol and formaldehyde which comprises subjecting the mass at a temperature above 30° C. to the action of material in quantity to form a mass consisting of two liquid phases at a pH in the aqueuos phase in the range from 4 to 9 of which mass the upper phase is a resinous solution more concentrated with respect to said condensation product, said material being selected from the group consisting of orthophosphoric acid, monosodium phosphate, disodium phosphate and aqueous solutions of each, the material so selected being such in number, kind and quantity as to provide in the upper liquid phase a quantity of phosphate salt of sodium which with water therein is separable as a phase in the hereinafter recited chilling of said upper phase, separating the upper liquid resinous phase in its liquid form from the material of the lower salt phase, chilling the separated upper liquid phase to form a phase containing salt and water and a new resin-containing liquid phase, and separating the resulting chilled new resin-containing liquid phase from the salt-containing phase.

23. The method of dewatering a homogeneous aqueous alkaline-catalyzed condensation mass of caustic soda, phenol and formaldehyde which comprises subjecting the mass at a temperature above 30° C. to the action of material in quantity to form a mass consisting of two liquid phases at a pH in the lower aqueous phase in the range from 4 to 9 of which mass the upper phase is a resinous solution more concentrated with respect to said condensation product, said material comprising essentially orthophosphoric acid and disodium phosphate, said material being such in kind and quantity as to provide in the upper liquid phase a quantity of phosphate salt of sodium which with water is separable in the hereinafter recited chilling of said upper phase, separating the upper liquid phase in its liquid form from the material of the lower phase, chilling the separated upper liquid phase to form a phase containing phosphate salt of sodium, and separating the resulting chilled resin-containing liquid from said salt-containing phase.

References Cited in the file of this patent
UNITED STATES PATENTS 2,397,018    Kroeger et al.  ---------- Mar. 19, 1946
2,489,569    Foulds et al.  ----------- Nov. 29, 1949